(12) United States Patent
Levijoki et al.

(10) Patent No.: US 9,234,447 B2
(45) Date of Patent: Jan. 12, 2016

(54) SYSTEM AND METHOD FOR DETERMINING SELECTIVE CATALYTIC REDUCTION DOSING SYSTEM PERFORMANCE USING AN AMMONIA SENSOR

(75) Inventors: Stephen Paul Levijoki, Swartz Creek, MI (US); James M. Perrin, Livonia, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1333 days.

(21) Appl. No.: 12/965,073

(22) Filed: Dec. 10, 2010

(65) Prior Publication Data

US 2012/0144801 A1 Jun. 14, 2012

(51) Int. Cl.
*F01N 3/00* (2006.01)
*F01N 3/10* (2006.01)
*F01N 3/20* (2006.01)
*F01N 11/00* (2006.01)

(52) U.S. Cl.
CPC ............. *F01N 3/208* (2013.01); *F01N 11/00* (2013.01); *F01N 2560/021* (2013.01); *F01N 2610/02* (2013.01); *F01N 2900/1402* (2013.01); *Y02T 10/24* (2013.01); *Y02T 10/47* (2013.01)

(58) Field of Classification Search
CPC ............. F01N 11/00; F01N 2560/021; F01N 2610/02; F01N 2900/1402; F01N 3/208; Y02T 10/24; Y02T 10/47

USPC ............ 60/274, 276, 277, 286, 295, 301, 303
See application file for complete search history.

(56) References Cited

U.S. PATENT DOCUMENTS

| | | | |
|---|---|---|---|
| 6,487,852 B1 * | 12/2002 | Murphy et al. .................. | 60/286 |
| 6,981,368 B2 * | 1/2006 | van Nieuwstadt et al. ..... | 60/277 |
| 6,993,900 B2 * | 2/2006 | Upadhyay et al. .............. | 60/286 |
| 7,065,958 B2 * | 6/2006 | Funk et al. ....................... | 60/286 |
| 7,121,085 B2 * | 10/2006 | van Nieuwstadt .............. | 60/286 |
| 7,418,816 B2 * | 9/2008 | Upadhyay et al. .............. | 60/285 |
| 7,610,750 B2 * | 11/2009 | Viola et al. ...................... | 60/286 |
| 8,061,122 B2 * | 11/2011 | Chaineux et al. ............... | 60/286 |
| 8,225,595 B2 * | 7/2012 | Garimella et al. .............. | 60/277 |
| 8,601,796 B2 * | 12/2013 | Hinz et al. ....................... | 60/295 |
| 2010/0024390 A1 | 2/2010 | Wills et al. | |

* cited by examiner

*Primary Examiner* — Thomas Denion
*Assistant Examiner* — Diem Tran

(57) ABSTRACT

A control system for a selective catalytic reduction (SCR) system includes a dosing control module, a comparison module, and a status determination module. The dosing control module controls a dosing system to inject a desired amount of ammonia into exhaust gas at a first location in an exhaust stream. The comparison module compares a measured amount of ammonia in the exhaust gas to the desired amount of ammonia, wherein the measured amount of ammonia is measured at a second location downstream from the first location and upstream from or within an SCR catalyst. The status determination module determines a pass/fail status of a component of the dosing system based on the comparison between the measured amount of ammonia and the desired amount of ammonia.

7 Claims, 3 Drawing Sheets

US 9,234,447 B2

SYSTEM AND METHOD FOR DETERMINING SELECTIVE CATALYTIC REDUCTION DOSING SYSTEM PERFORMANCE USING AN AMMONIA SENSOR

FIELD

The present disclosure relates to exhaust treatment systems and more particularly to a system and method for determining selective catalytic reduction (SCR) dosing system performance using an ammonia sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combine air and fuel to create an air/fuel (A/F) mixture that is combusted within a plurality of cylinders. The combustion of the A/F mixture drives pistons which rotatably turns a crankshaft and generates drive torque. In compression ignition (CI) engines, air may be drawn into the cylinders and compressed by the pistons. Fuel may then be injected into the compressed air causing the pressurized A/F mixture to combust. For example, CI engines include diesel engines.

Exhaust gas produced during combustion may be expelled from the cylinders into an exhaust manifold. The exhaust gas may include carbon monoxide (CO) and hydrocarbons (HC). The exhaust gas may also include nitrogen oxides (NOx) due to the higher combustion temperatures of CI engines compared to spark ignition (SI) engines. An exhaust treatment system may treat the exhaust gas to remove CO, HC, and/or NOx. For example, the exhaust treatment system may include at least one of an oxidation catalyst (OC), NOx absorbers/adsorbers, a selective catalytic reduction (SCR) system, a particulate matter (PM) filter, and catalytic converters.

In the SCR process, a dosing agent is injected into the exhaust gas by a dosing system. For example, the dosing agent may be pure anhydrous ammonia, aqueous ammonia, or urea. The dosing agent includes a reductant that reacts with the NOx in the exhaust gas. For example, the reductant may be ammonia ($NH_3$). The reductant mixes with the NOx in the exhaust gas and the mixture may be absorbed onto the SCR catalyst. The SCR catalyst may then break down the absorbed mixture forming water vapor ($H_2O$) and nitrogen gas ($N_2$). The SCR process, therefore, may significantly reduce NOx emissions.

SUMMARY

A control system for a selective catalytic reduction (SCR) system includes a dosing control module, a comparison module, and a status determination module. The dosing control module controls a dosing system to inject a desired amount of ammonia into exhaust gas at a first location in an exhaust stream. The comparison module compares a measured amount of ammonia in the exhaust gas to the desired amount of ammonia, wherein the measured amount of ammonia is measured at a second location downstream from the first location and upstream from or within an SCR catalyst. The status determination module determines a pass/fail status of a component of the dosing system based on the comparison between the measured amount of ammonia and the desired amount of ammonia.

A method for controlling a selective catalytic reduction (SCR) system includes controlling a dosing system to inject a desired amount of ammonia into exhaust gas at a first location in an exhaust stream, measuring an amount of ammonia in the exhaust gas at a second location downstream from the first location and upstream from or within an SCR catalyst, comparing the measured amount of ammonia to the desired amount of ammonia, and determining a pass/fail status of a component of the dosing system based on the comparison between the measured amount of ammonia and the desired amount of ammonia.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
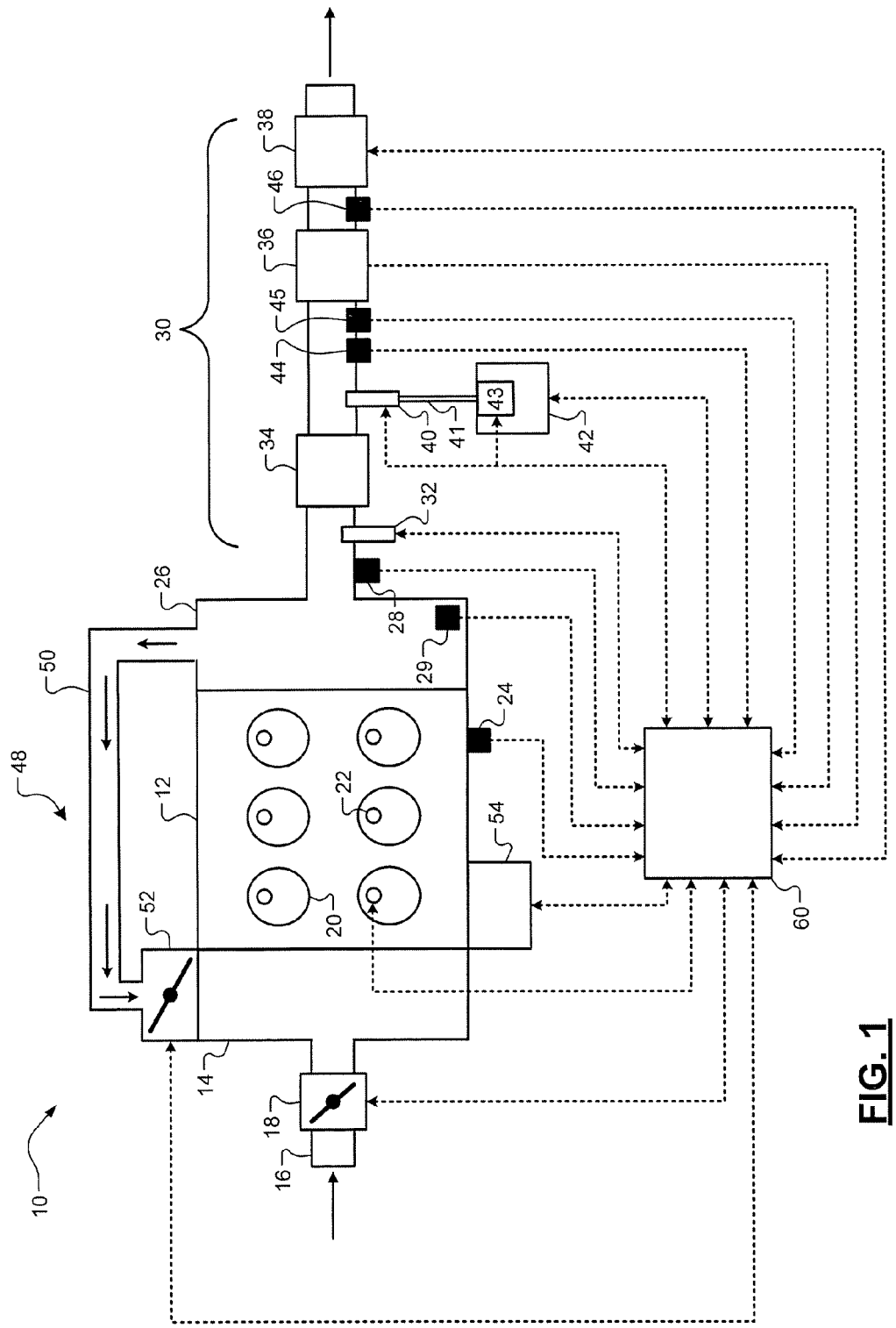
FIG. 1 is a functional block diagram of an engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Selective catalytic reduction (SCR) systems may include an SCR catalyst and nitrogen oxide (NOx) sensors disposed upstream and downstream from the SCR catalyst. The NOx sensors may measure an amount of NOx in the exhaust stream before and after the SCR catalyst to determine a conversion efficiency of the SCR catalyst. The NOx sensors, however, may be "cross-sensitive" and thus may detect ammonia (NH3) as NOx in the exhaust stream. Alternatively, ammonia sensors may be disposed in the exhaust stream to measure an amount of ammonia in the exhaust gas. The ammonia is present in the exhaust stream due to injection of a dosing agent (e.g., urea) that includes ammonia.

Detection of ammonia downstream from the SCR catalyst is also known as "ammonia slip." Ammonia slip may indicate a degraded SCR catalyst (i.e., a conversion efficiency less than a predetermined threshold). Ammonia slip, however, may also indicate problems with the dosing system. For example, excessive injection of the dosing agent may cause ammonia slip regardless of the state of the SCR catalyst. Other dosing system problems may cause an insufficient amount of dosing agent to be injected, which may result in excess NOx downstream from the SCR catalyst. Excess NOx detected downstream from the SCR catalyst may also indicate a degraded SCR catalyst. In other words, problems with the dosing system may be incorrectly detected as problems with the conversion efficiency of the SCR catalyst. The incorrect determination of a degraded SCR catalyst may result in unnecessary replacements which may increase cost.

Accordingly, a system and method for determining performance of an SCR dosing system using an ammonia ($NH_3$) sensor is presented. Alternatively, the system and method may use a combination NOx/$NH_3$ sensor. The system and method may first control a dosing system to inject of a desired amount of ammonia (i.e., dosing agent) into exhaust gas produced by an engine. For example, the desired amount of ammonia may be based on a conversion efficiency of an SCR catalyst, which may be determined based on measurements from upstream and downstream NOx sensors. Additionally, the desired amount of ammonia may be further based on exhaust mass air flow (EMAF), exhaust gas temperature (EGT), and/or the amount of $NH_3$ currently present in the SCR system ("stored $NH_3$").

The system and method may then compare a measured amount of ammonia in the exhaust gas to the desired amount of ammonia. The measured amount of ammonia may be measured at a location downstream from a dosing agent injector and upstream from an SCR catalyst. Alternatively, the measured amount of ammonia in the exhaust gas may be measured at a location within the SCR catalyst. Based on the comparison, the system and method may determine a pass/fail status of a component of the dosing system. The dosing system may include the dosing agent injector, a dosing agent line, a dosing agent supply, and a dosing agent supply pump (as well as the SCR catalyst and NOx sensors). In some implementations, the system and method may determine which specific component of the dosing system has failed based on dosing agent flow measurements and/or dosing agent quantity measurements.

When the measured amount of ammonia is less than the desired amount of ammonia, the system and method may generate a first fail status indicating a problem related to low ammonia. For example, the first fail status may indicate that the dosing agent injector is restricted/clogged, the dosing agent line is restricted, the dosing agent line has a leak, the dosing agent supply includes low quality (e.g., diluted) dosing agent, or a low pressure dosing agent supply pump. When the measured amount of ammonia is greater than the desired amount of ammonia, the system and method may generate a second fail status indicating a problem related to high ammonia. For example, the second fail status may indicate that the dosing agent injector is stuck in an open state (and therefore injecting excessive amounts of dosing agent), a high pressure dosing agent supply pump, or a low ammonia storage capacity of the SCR catalyst (i.e., when the amount of ammonia is measured at a location is within the SCR catalyst). The pass/fail status may be used as an on-board diagnostic (OBD) to detect and report a malfunctioning dosing system. This feedback can also be used to make adjustments to the dosing controller and may be read by a technician for more accurate troubleshooting and thus more efficient vehicle maintenance.

Referring now to FIG. 1, an engine system 10 includes an engine 12. For example, the engine 12 may be a CI engine (e.g., a diesel engine). The engine 12, however, may also be a different type of engine (e.g., a homogeneous charge compression ignition, or HCCI engine). The engine 12 draws air into an intake manifold 14 through an inlet system 16 that may be regulated by a throttle 18. For example, the throttle 18 may be electrically controlled via electronic throttle control (ETC).

Air from the intake manifold 14 is distributed into a plurality of cylinders 20. While six cylinders are shown, it can be appreciated that the engine 12 may include other numbers of cylinders. Fuel injectors 22 may inject fuel directly into the cylinders 20. Alternatively, however, the fuel injectors 22 may inject fuel via intake ports of the cylinders 20. The fuel injectors 22 may also inject fuel into the cylinders 20 after combustion of the A/F mixture ("post-combustion injection") to introduce hydrocarbons (HC) into exhaust gas.

Pistons (not shown) compress and combust the A/F mixture within the cylinders 20. The pistons drive an engine crankshaft (not shown) during a power stroke to produce drive torque. In HCCI engines, the cylinders 20 may include spark plugs (not shown). An engine speed sensor 24 measures a rotational speed of the engine crankshaft (not shown). For example, the engine speed sensor 24 may measure the rotational speed in revolutions per minute, or RPM. Exhaust gas resulting from combustion is expelled into an exhaust manifold 26. The exhaust gas may then be treated by an exhaust treatment system and/or recirculated to the intake manifold 14 via an exhaust gas recirculation (EGR) system 48.

An exhaust mass air flow (EMAF) sensor 28 may measure a flow rate of exhaust gas through an exhaust treatment system 30. An exhaust gas temperature (EGT) sensor 29 may measure a temperature of the exhaust gas in the exhaust manifold 26 and the exhaust treatment system 30. The exhaust treatment system 30 may include an auxiliary injector 32, an OC 34, an SCR catalyst 36, and a PM filter 38. The auxiliary injector 32 may selectively inject HC (e.g., fuel) into the exhaust gas. For example, the auxiliary injector 32 may inject HC into the exhaust gas to increase the exhaust gas temperature (EGT) for regeneration of the PM filter 38. As previously described, however, the fuel injectors 22 may perform post-combustion injection to introduce HC into the exhaust gas.

The OC 34 oxidizes CO and HC to form $CO_2$ and $H_2O$. The SCR catalyst 36 (in conjunction with a reductant such as ammonia) removes NOx from the exhaust gas. The PM filter 38 removes PM from the exhaust gas before the exhaust gas is released into the atmosphere. The exhaust treatment system 30 may further include a dosing system. The dosing system may include dosing agent injector 40, a dosing agent line 41, a dosing agent supply 42, a dosing agent supply pump 43 (as well as the SCR catalyst 36 and sensors). Specifically, the sensors may include first and second NOx sensors 44, 46, and an ammonia sensor 45. While a separate NOx sensor 44 and ammonia sensor 45 are shown upstream from the SCR catalyst 36, the exhaust treatment system 30 may include a single combination $NOx/NH_3$ sensor.

The first and second NOx sensors 44, 46 measure an amount of NOx in the exhaust gas. The ammonia sensor 45 measures an amount of ammonia $NH_3$ in the exhaust gas at a location downstream from the dosing agent injector 40 and upstream from the SCR catalyst 36. Alternatively, the ammonia sensor 45 may be disposed within the SCR catalyst 36. The first and second NOx sensors 44, 46 may be referred to as upstream NOx sensor 44 and downstream NOx sensor 46 based on their locations in the exhaust stream with respect to the SCR catalyst 36. In some embodiments, the NOX sensors 44, 46 may be "cross-sensitive" and thus may detect both NOx and $NH_3$. While one EGT sensor 29, two NOx sensors 44, 46, and one ammonia sensor 45 are shown, the exhaust treatment system may include other numbers of temperature, NOx, and/or ammonia sensors.

A control module 60 communicates with and/or controls various components of the engine system 10. Specifically, the control module 60 may receive signals from the engine speed sensor 24, the EMAF sensor 28, the EGT sensor 29, the dosing agent supply 42, the dosing agent supply pump 43, the NOx sensors 44, 46, and the ammonia sensor 45. The control module 60 may also control the throttle 18, the fuel injectors 22, spark plugs (not shown) (if implemented, such as in an HCCI engine), the auxiliary injector 32, the dosing agent injector 40, the dosing agent supply pump 43, and an EGR valve 52 (discussed in more detail below). The control module 60 may also implement the system or method of the present disclosure.

The engine system 10 may further include the EGR system 48. The EGR system 48 includes the EGR valve 52 and an EGR line 50. The EGR system 48 may introduce a portion of exhaust gas from the exhaust manifold 26 into the intake manifold 14. The EGR valve 52 may be mounted on the intake manifold 14. The EGR line 50 may extend from the exhaust manifold 26 to the EGR valve 52, providing communication between the exhaust manifold 26 and the EGR valve 52. As previously described, the control module 60 may actuate the EGR valve 52 to control an amount of exhaust gas introduced into the intake manifold 14.

The engine 12 may also include a turbocharger 54. The turbocharger 54 may be driven by the exhaust gas received through a turbine inlet. For example only, the turbocharger 54 may include a variable nozzle turbine (VNT). The turbocharger 54 increases airflow into the intake manifold 14 to cause an increase in intake MAP (i.e., manifold absolute pressure, or boost pressure). The control module 60 may actuate the turbocharger 54 to selectively restrict the flow of the exhaust gas, thereby controlling the boost pressure.

Figure 2:
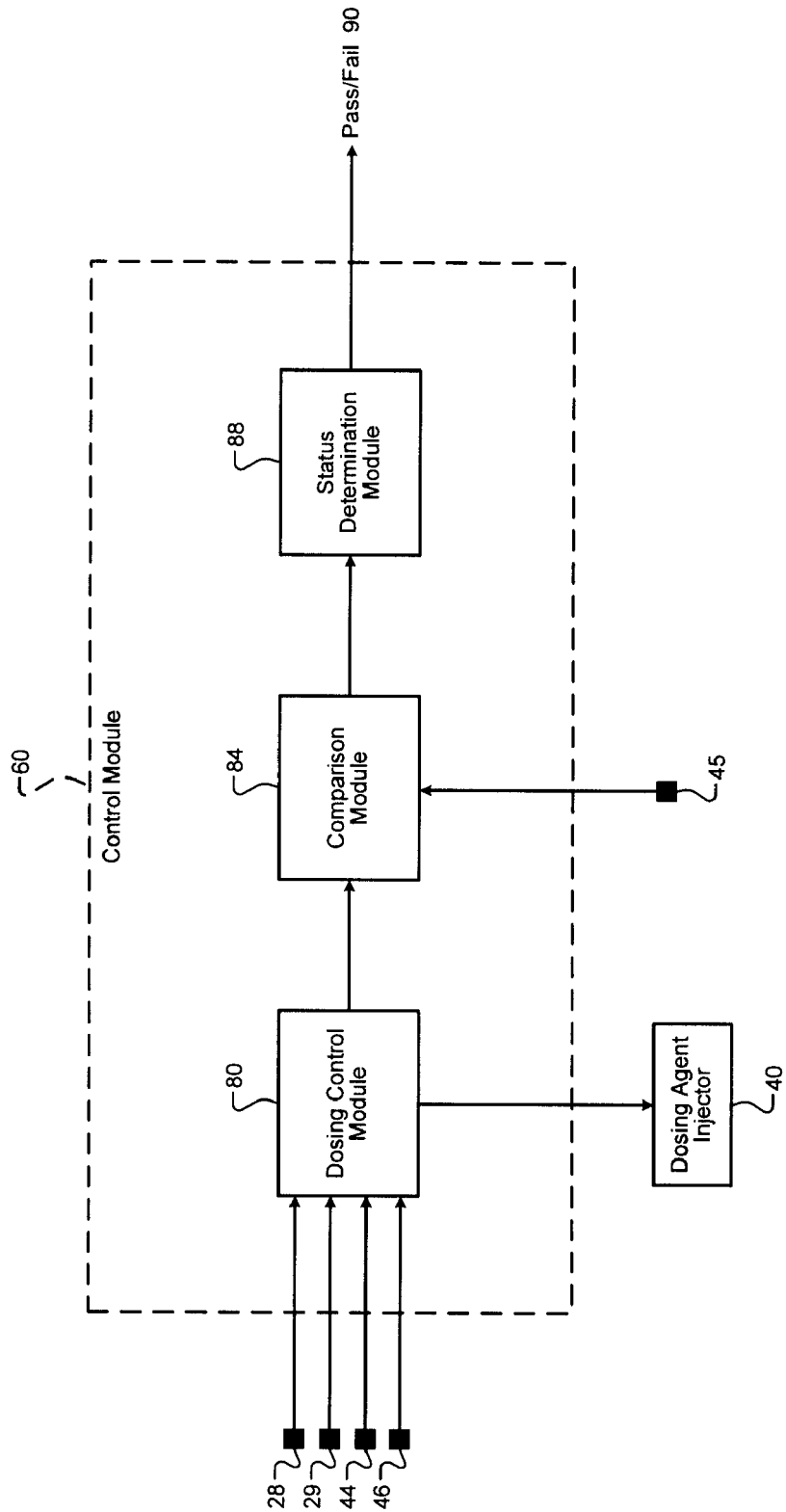
FIG. 2 is a functional block diagram of a control module according to one implementation of the present disclosure.

Referring now to FIG. 2, an example of the control module 60 is shown. The control module 60 may include a dosing control module 80, a comparison module 84, and a status determination module 88.

The dosing control module 80 controls the dosing system to inject a desired amount of ammonia into the exhaust gas. Specifically, the dosing control module 80 may control the dosing agent injector 40 to inject the desired amount into the exhaust gas. Rather, the dosing agent injector 40 may inject a desired amount of dosing agent into the exhaust gas which corresponds to the desired amount of ammonia. The desired amount of ammonia may be based on a conversion efficiency of the SCR catalyst 36 which may be determined based on measurements from the upstream and downstream NOx sensors 44, 46. Additionally, the desired amount of ammonia in the exhaust gas may be further based on EMAF and/or EGT from EMAF sensor 28 and EGT sensor 29, respectively. For example, the dosing control module 80 may use a lookup table to determine the desired amount of ammonia in the exhaust gas based on the SCR catalyst conversion efficiency, EMAF, and/or EGT.

The comparison module 84 receives the desired amount of ammonia from the dosing control module 80. The comparison module 84 also receives measurements from the ammonia sensor 45 indicating a measured amount of ammonia in the exhaust gas. The comparison module 84 compares the measured amount of ammonia to the desired amount of ammonia. For example, the comparison module 84 may generate a difference between the measured amount of ammonia and the desired amount of ammonia.

The status determination module 88 receives the comparison from the comparison module 84. For example, the status determination module 88 may receive the difference between the measured amount of ammonia and the desired amount of ammonia. Based on the comparison, the status determination module 88 may generate a pass/fail status 90 for a component of the dosing system. For example, the status determination module 88 may generate the pass/fail status 90 for the dosing agent injector 40, the dosing agent line 41, the dosing agent supply 42, or the dosing agent supply pump 43. The pass/fail status can be used for OBD and/or dosing system diagnosis by a technician. In some implementations, the status determination module 88 may determine which specific component of the dosing system has failed based on dosing agent flow measurements and/or dosing agent quantity measurements.

Specifically, when the measured amount of ammonia is less than the desired amount of ammonia, the status determination module 88 may generate a first fail status indicating a problem related to low ammonia. For example, the first fail status may indicate a clogged dosing agent injector 40, a restricted dosing agent line 41, a leak in the dosing agent line 41, a low quality dosing agent supply 42, or a low pressure dosing agent supply pump 43. Conversely, when the measured amount of ammonia is greater than the desired amount of ammonia, the status determination module 88 may generate a second fail status indicating a problem related to high ammonia. For example, the second fail status may indicate that the dosing agent injector 40 is stuck in an open state (and therefore injecting excessive amounts of dosing agent), a high pressure dosing agent supply pump 43, or a low ammonia storage capacity of the SCR catalyst 36 (i.e., when the amount of ammonia is measured at a location within the SCR catalyst 36).

When the measured amount of ammonia is equal to or approximately equal to the desired amount of ammonia, the status determination module 88 may determine that none of the dosing system components are malfunctioning. For example, the status determination module 88 may generate pass statuses for each of the dosing agent injector 40, the dosing agent line 41, and the dosing agent supply 42. However, if the conversion efficiency of the SCR catalyst 36 remains less than a predetermined threshold, the SCR catalyst 36 may be degraded and thus may require replacement. In some embodiments, the status determination module 88 may then generate a fail status for the SCR catalyst 36 when the measured amount of ammonia is equal to or approximately equal to the expected amount of ammonia.

Figure 3:
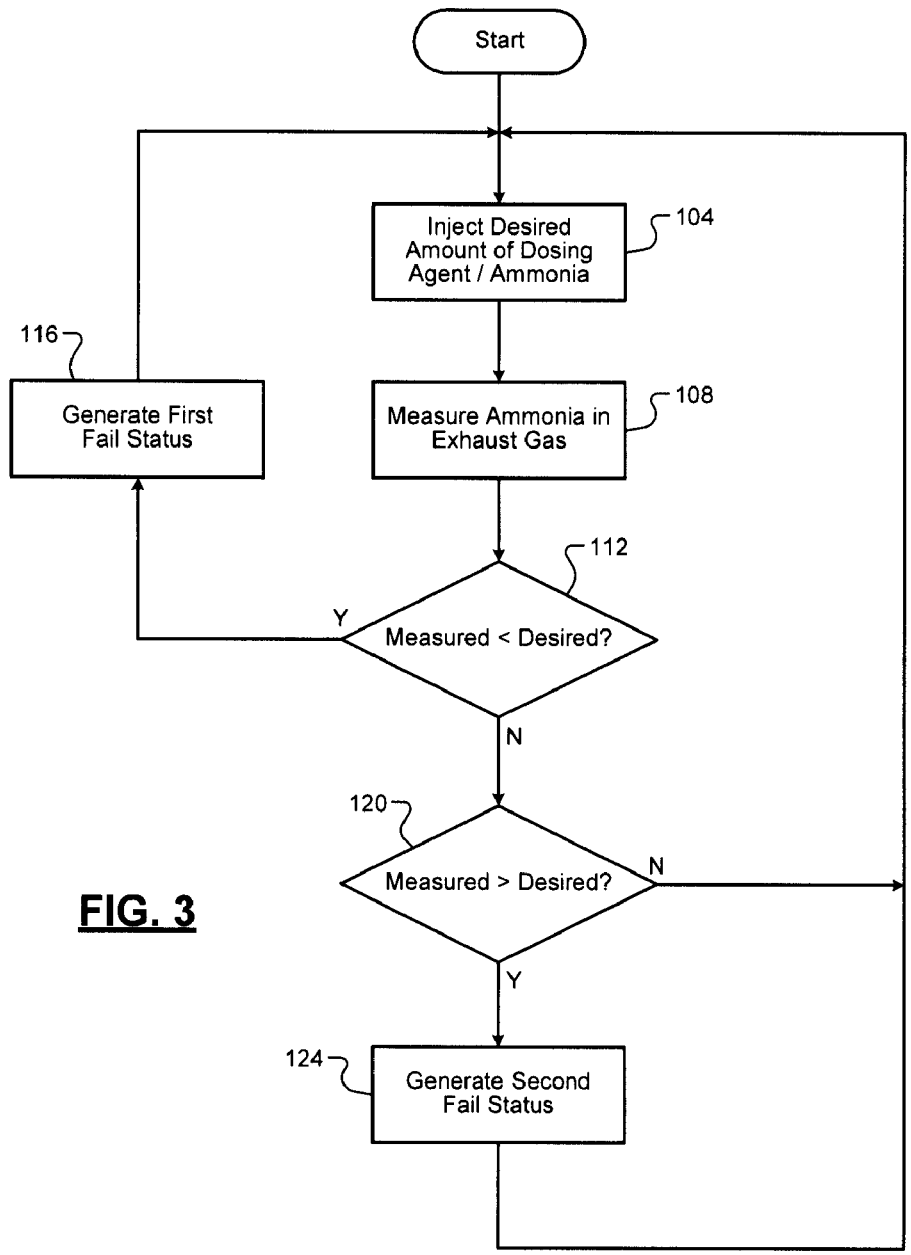
FIG. 3 is a flow diagram for a method of determining selective catalytic reduction (SCR) dosing system performance using an ammonia sensor according to one implementation of the present disclosure.

Referring now to FIG. 3, an example method for determining performance of an SCR dosing system begins at 104. At 104, control actuates the dosing agent injector 40 to inject a desired amount of ammonia (i.e., a desired amount of dosing agent) into the exhaust gas produced by the engine 12. For example, the desired amount of ammonia may be based on a conversion efficiency of the SCR catalyst, EMAF, and/or EGT. Additionally, for example, the conversion efficiency of the SCR catalyst 36 may be based on measurements from the upstream and downstream NOx sensors 44, 46.

At 108, control measures an amount of ammonia at a location downstream from the dosing agent injector 40 and upstream from the SCR catalyst 36. Alternatively, control may measure the amount of ammonia in the exhaust gas at a location within the SCR catalyst 36. At 112, control determines whether the measured amount of ammonia is less than the desired amount of ammonia. If true, control may proceed to 116. If false, control may proceed to 120.

At 116, control may generate a fail status for a component of the dosing system indicating a problem related to low ammonia. For example, the fail status may indicate one of a clogged dosing agent injector 40, a restricted dosing agent line 41, a leak in the dosing agent line 41, a low quality dosing agent supply 42, or a low pressure dosing agent supply pump 43. Control may then return to 104.

At 120, control may determine whether the measured amount of ammonia is greater than the desired amount of ammonia. If true, control may proceed to 124. If false, control may return to 128 because the measured amount of ammonia in the exhaust gas is equal to or approximately equal to the desired amount of ammonia in the exhaust gas. At 124, control may generate a fail status indicating a problem related to high ammonia. For example, the fail status may indicate that the dosing agent injector 40 is stuck in an open state (and therefore injecting excessive dosing agent), a high pressure dosing agent supply pump 43, or a low ammonia storage capacity of the SCR catalyst 36 (i.e., when the amount of ammonia is measured at a location within the SCR catalyst 36). Control may then return to 104.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a selective catalytic reduction (SCR) system, comprising:
a dosing control module that controls a dosing system to inject a desired amount of ammonia into exhaust gas at a first location in an exhaust stream;
a comparison module that compares a measured amount of ammonia in the exhaust gas to the desired amount of ammonia, wherein the measured amount of ammonia is measured at a second location downstream from the first location and upstream from or within an SCR catalyst; and
a status determination module that determines a pass/fail status of a component of the dosing system based on the comparison between the measured amount of ammonia and the desired amount of ammonia,
wherein the dosing system includes a plurality of components, the plurality of components including a dosing agent injector, a dosing agent line, a dosing agent supply pump, a dosing agent supply, the SCR catalyst, and nitrogen oxide (NOx) sensors, and
wherein the status determination module is configured to generate a first fail status when the measured amount of ammonia is less than the desired amount of ammonia, and generate a second fail status when the measured amount of ammonia is greater than the desired amount of ammonia.

2. The control system of claim 1, wherein the first fail status indicates that the dosing agent injector is clogged.

3. The control system of claim 1, wherein the first fail status indicates that the dosing agent line is restricted or the dosing agent line has a leak.

4. The control system of claim 1, wherein the first fail status indicates a low pressure dosing agent supply pump or that the dosing agent supply contains low quality dosing agent.

5. The control system of claim 1, wherein the second fail status indicates a high pressure dosing agent supply pump or that the dosing agent injector is stuck in an open state.

6. The control system of claim 1, wherein the second fail status indicates a low ammonia storage capacity of the SCR catalyst when the second location is within the SCR catalyst.

7. The control system of claim 1, wherein based on at least one of dosing agent flow and dosing agent quantity measurements, the status determination module determines which of the plurality of components has failed.

* * * * *